United States Patent
Fujita

(10) Patent No.: US 11,046,456 B2
(45) Date of Patent: Jun. 29, 2021

(54) TAKEOFF AND LANDING ASSIST APPARATUS FOR FLIGHT VEHICLE, AND FLIGHT DEVICE

(71) Applicant: MITSUBISHI HEAVY INDUSTRIES, LTD., Tokyo (JP)

(72) Inventor: Jun Fujita, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 279 days.

(21) Appl. No.: 16/063,923

(22) PCT Filed: Dec. 2, 2016

(86) PCT No.: PCT/JP2016/085911
§ 371 (c)(1),
(2) Date: Jun. 19, 2018

(87) PCT Pub. No.: WO2017/145485
PCT Pub. Date: Aug. 31, 2017

(65) Prior Publication Data
US 2018/0370653 A1    Dec. 27, 2018

(30) Foreign Application Priority Data
Feb. 26, 2016 (JP) .............................. JP2016-036328

(51) Int. Cl.
*B64F 1/02* (2006.01)
*B64C 27/08* (2006.01)
(Continued)

(52) U.S. Cl.
CPC ............ *B64F 1/0299* (2020.01); *B64C 27/08* (2013.01); *B64C 39/024* (2013.01); *B64D 45/04* (2013.01);
(Continued)

(58) Field of Classification Search
CPC .... B64F 1/007; B64F 1/02; B64F 1/12; B64F 1/125; B64C 2201/088
See application file for complete search history.

(56) References Cited

U.S. PATENT DOCUMENTS 4,174,081 A  *  11/1979  Sardanowsky ........... B64F 1/12
                                                                  114/297
9,139,310 B1    9/2015  Wang
(Continued)

FOREIGN PATENT DOCUMENTS

DE          102013004881 A1    9/2014
JP          2010-179914 A       8/2010
(Continued)

OTHER PUBLICATIONS

Extended European Search Report dated Sep. 16, 2019, issued in counterpart EP Application No. 16891641.9. (9 pages).
(Continued)

*Primary Examiner* — Richard R. Green
(74) *Attorney, Agent, or Firm* — Westerman, Hattori, Daniels & Adrian, LLP

(57) ABSTRACT

A takeoff and landing assist apparatus for a flight vehicle with rotor blades causes the flight vehicle to take off from or be landed on a target point. The takeoff and landing assist apparatus includes a plurality of guide rods in parallel to each other, the plurality of guide rods being provided to one of the flight vehicle and the target point; and a plurality of guide rings into which the plurality of guide rods are insertable, the plurality of guide rings being provided to the other of the flight vehicle and the target point. A center-to-center distance between the plurality of guide rods and a center-to-center distance between the plurality of guide rings are set to be same.

13 Claims, 5 Drawing Sheets

(51) Int. Cl.
*B64F 1/12* (2006.01)
*B64D 45/04* (2006.01)
*B64F 1/00* (2006.01)
*B64C 39/02* (2006.01)

(52) U.S. Cl.
CPC ............... *B64F 1/007* (2013.01); *B64F 1/02* (2013.01); *B64F 1/12* (2013.01); *B64F 1/125* (2013.01); *B64C 2201/024* (2013.01); *B64C 2201/027* (2013.01); *B64C 2201/088* (2013.01); *B64C 2201/182* (2013.01); *B64C 2201/20* (2013.01)

(56) References Cited

U.S. PATENT DOCUMENTS

| | | | |
|---|---|---|---|
| 10,577,126 B2 * | 3/2020 | Mozer | .................. B64F 1/007 |
| 2010/0193626 A1 | 8/2010 | Goossen et al. | |
| 2011/0024559 A1 | 2/2011 | McGeer et al. | |
| 2011/0264314 A1 | 10/2011 | Parras | |
| 2015/0158598 A1 | 6/2015 | You | |
| 2016/0001883 A1 | 1/2016 | Sanz et al. | |
| 2019/0276147 A1 * | 9/2019 | Lee | .................. B64F 1/007 |
| 2020/0247558 A1 * | 8/2020 | Tian | .................. B64F 1/007 |

FOREIGN PATENT DOCUMENTS

| | | |
|---|---|---|
| JP | 2011-230756 A | 11/2011 |
| JP | 2015-182744 A | 10/2015 |
| KR | 10-2013-0122715 A | 11/2013 |
| WO | 2014/054039 A2 | 4/2014 |
| WO | 2015/195175 A2 | 12/2015 |
| WO | 2016/019978 A1 | 2/2016 |
| WO | 2016/137982 A1 | 9/2016 |
| WO | WO-2016137982 A1 * 9/2016 ........... B64C 39/024 |

OTHER PUBLICATIONS

Translation of Written Opinion dated Dec. 27, 2016, issued in counterpart application No. PCT/JP2016/085911. (5 pages).

International Search Report dated Dec. 27, 2016, issued in counterpart applcation No. PCT/JP2016/085911. (2 pages).

Office Action dated Jan. 7, 2020, issued in counterpart JP application No. 2016-036328, with English translation. (8 pages).

* cited by examiner

TAKEOFF AND LANDING ASSIST APPARATUS FOR FLIGHT VEHICLE, AND FLIGHT DEVICE

FIELD

The present invention relate to a takeoff and landing assist apparatus for a flight vehicle, and a flight device for assisting a takeoff operation and a landing operation of the flight vehicle.

BACKGROUND

A flight vehicle with rotor blades ascends by increasing the number of rotations of the rotor blades or increasing a pitch angle of the rotor blades tilting the pitch angle in a direction of increasing a lifting power of the rotor blades), and descends by decreasing the number of rotations of the rotor blades or decreasing the pitch angle of the rotor blades (tilting the pitch angle in a direction of decreasing the lifting power of the rotor blades). In particular, an unmanned flight vehicle includes rotor blades each driven by a driving device (such as a motor or an internal-combustion engine), and a user controls to drive this driving device or controls the pitch angle of the rotor blades either automatically or manually through a wireless network or a wired network.

One example of such techniques is described in Patent Literature 1.

CITATION LIST

Patent Literature

Patent Literature 1: U.S. Patent Application Publication No. 2016/0001883

SUMMARY

Technical Problem

In order to land a flight vehicle, a driving device is controlled to drive the flight vehicle so that the number of rotations of the rotor blades is decreased. Thus, the flight vehicle descends and is landed on a ground. In this case, since the number of rotations of the rotor blades is decreased and the flight vehicle descends at lower speed, the lifting power of the rotor blades decreases. Therefore, it is difficult to control the posture of the flight vehicle just before the flight vehicle is landed and the state is instable. Accordingly, the flight vehicle is easily influenced by a change in environment such as wind just before the flight vehicle is landed, and it is difficult for the flight vehicle to be landed in a stable posture. In addition, when the flight vehicle is landed, the flight vehicle is influenced by a change in air flow between the rotor blades and the ground, what is called a surface effect, and in this case, it is also difficult for the flight vehicle to be landed in a stable posture.

The present invention has been made in order to solve the above-described problem, and an object is to provide a takeoff and landing assist apparatus for a flight vehicle, and a flight device, that enable the flight vehicle to take off or be landed stably.

Solution to Problem

To achieve the object described above, a takeoff and landing assist apparatus for a flight vehicle of the present invention causes the flight vehicle with rotor blades to take off from or be landed on a target point. The takeoff and landing assist apparatus includes a plurality of guide rods in parallel to each other, the plurality of guide rods being provided to one of the flight vehicle and the target point; and a plurality of guide rings into which the plurality of guide rods are insertable, the plurality of guide rings being provided to the other of the flight vehicle and the target point. A center-to-center distance between the plurality of guide rods and a center-to-center distance between the plurality of guide rings are set to be same.

Therefore, when the flight vehicle takes off or is landed, inserting the guide rods into the guide rings makes it possible to reduce the disturbance of the posture of the flight vehicle due to an influence from a change in ambient environment or a surface effect. Thus, the flight vehicle can take off from or be landed on the target point easily and stably.

In the takeoff and landing assist apparatus for a flight vehicle of the present invention, each of the plurality of guide rods has a different length.

Therefore, when the flight vehicle is landed on the target point, the guide rods with the different lengths are inserted into the guide rings sequentially; thus, the guide rods can be easily inserted into the guide rings.

In the takeoff and landing assist apparatus for a flight vehicle of the present invention, the plurality of guide rods each have a tapered shape that is tapered toward a distal end.

Therefore, since each of the guide rods has a tapered shape that becomes thinner toward a distal end, the guide rods can easily be inserted into the guide rings.

The takeoff and landing assist apparatus for a flight vehicle of the present invention further includes a detector configured to detect that the guide ring is passed by the guide rod.

Therefore, since the detector detects that the guide ring is passed by the guide rod, it is possible to recognize that the flight vehicle is restricted by and released from the guide rods in the horizontal direction and thus, the output of the flight vehicle can foe properly adjusted.

In the takeoff and landing assist apparatus for a flight vehicle of the present invention, the plurality of guide rods include three or more guide rods.

Therefore, the flight vehicle is restricted by the guide rods at three or more positions in the horizontal direction, so that the flight vehicle can be guided in a stable posture.

In the takeoff and landing assist apparatus for a flight vehicle of the present invention, a target object is provided to the target point, the target object being detectable from the flight vehicle side.

Therefore, the flight vehicle can be landed while detecting the target object provided at the target point and this allows the flight vehicle to be landed on the target point with high accuracy.

In the takeoff and landing assist apparatus for a flight vehicle of the present invention, the plurality of guide rods or the plurality of guide rings are disposed outside the rotor blades.

Therefore, since the guide rods or the guide rings are disposed outside the rotor blades, interference between the rotor blades and the guide rods or the guide rings can be reduced.

In the takeoff and landing assist apparatus for a flight vehicle of the present invention, the plurality of guide rods are disposed at the target point along a vertical direction.

Therefore, since the guide rods are disposed at the target point along the vertical direction, moving the flight vehicle along the vertical direction makes it possible to insert the guide rods into the guide rings easily.

The takeoff and landing assist apparatus for a flight vehicle of the present invention further includes an adjustment mechanism 50 configured to cause the plurality of guide rods to keep standing along the vertical direction.

Therefore, when the guide rods are provided to the movable body, the adjustment mechanism 50 can make the guide rods always keep standing along the vertical direction, so that the guide rods can be inserted into the guide rings easily.

In the takeoff and landing assist apparatus for a flight vehicle of the present invention, as a wind speed increases, the adjustment mechanism 50 largely tilts distal ends of the plurality of guide rods against wind based on information from an anemometer.

Therefore, when the flight vehicle that is in a hovering state is landed by tilting the flight vehicle against the wind, the guide rods can be inserted into the guide rings easily.

A flight device of the present invention includes a flight vehicle including rotor blades; and the takeoff and landing assist apparatus for a flight vehicle.

Therefore, when the flight vehicle takes off or is landed by using the takeoff and landing assist apparatus, inserting the guide rods into the guide rings enables the flight vehicle to take off from or be landed on the target point easily and stably.

In the flight device of the present invention, the plurality of guide rods are provided to a movable body, and the plurality of guide rings are provided to the flight vehicle.

Therefore, the guide rods can be provided to the movable body, the flight vehicle can take off from or be landed on the Movable body fey the use of the guide rings, and the flight device can be moved to a desired place and be used.

In the flight device of the present invention, the plurality of guide rods are provided to a building, and the plurality of guide rings are provided to the flight vehicle.

Therefore, the guide rods can be provided to the building, the flight vehicle can take off from or be landed on the building by the use of the guide rings, and for example, can convey baggage easily.

Advantageous Effects of Invention

The takeoff and landing assist apparatus for a flight vehicle and the flight device according to the present invention include the guide rods on one of the flight vehicle and the target point and include the guide rings on the other. Thus, when the flight vehicle takes off or is landed, inserting the guide rods into the guide rings makes it possible for the flight vehicle to take off from or be landed on the target point easily and stably.

DESCRIPTION OF EMBODIMENT

A preferred embodiment of a takeoff and landing assist apparatus for a flight vehicle and a flight device according to the present invention will be described in detail with reference to the attached drawings. Note that the present invention is not limited by the embodiment and if there is a plurality of embodiments, the embodiments may be implemented in combination.

Figure 1A:
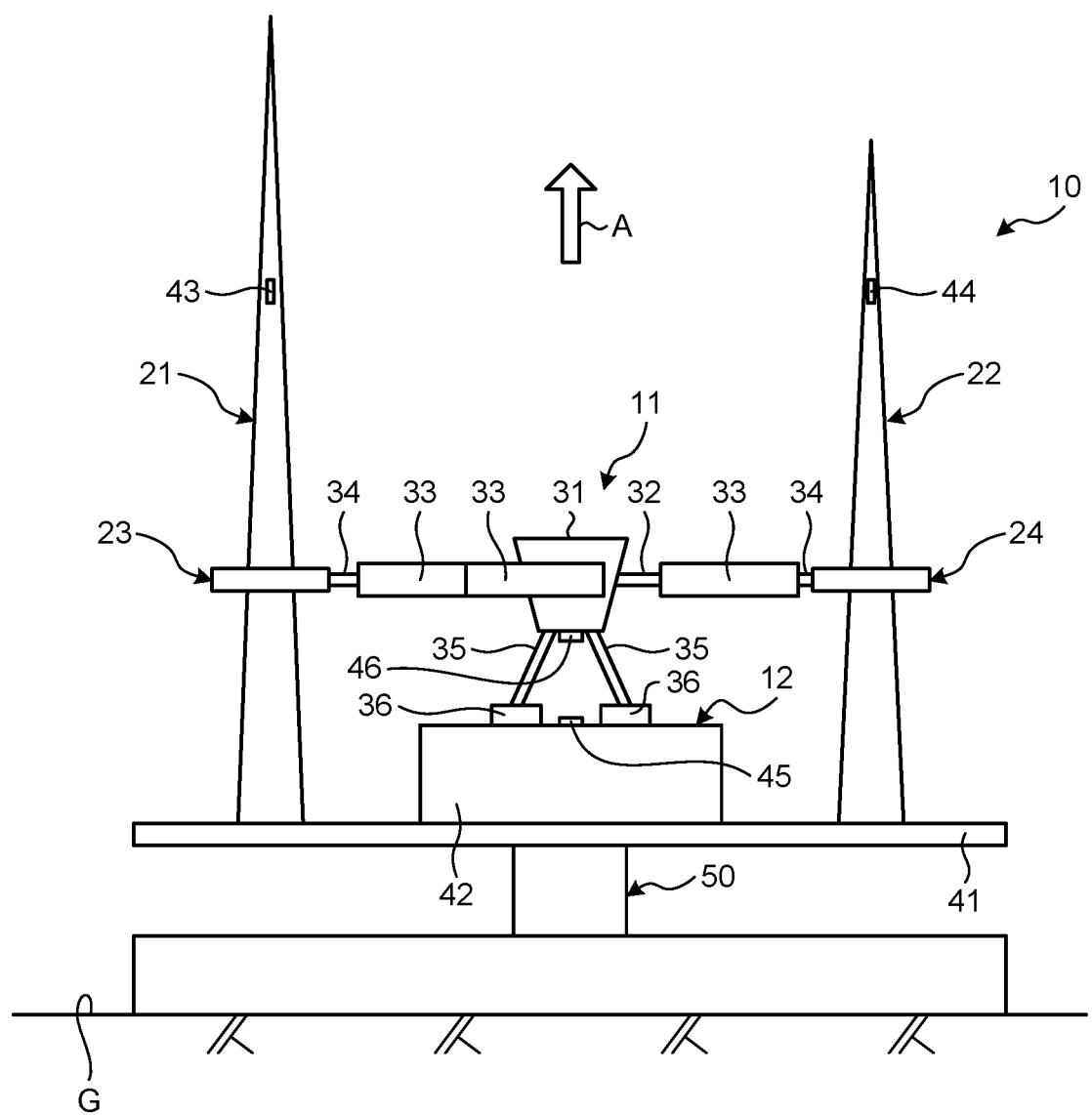
FIG. 1A is a front view illustrating a takeoff and landing assist apparatus for a flight vehicle according to the present embodiment.
Figure 1B:
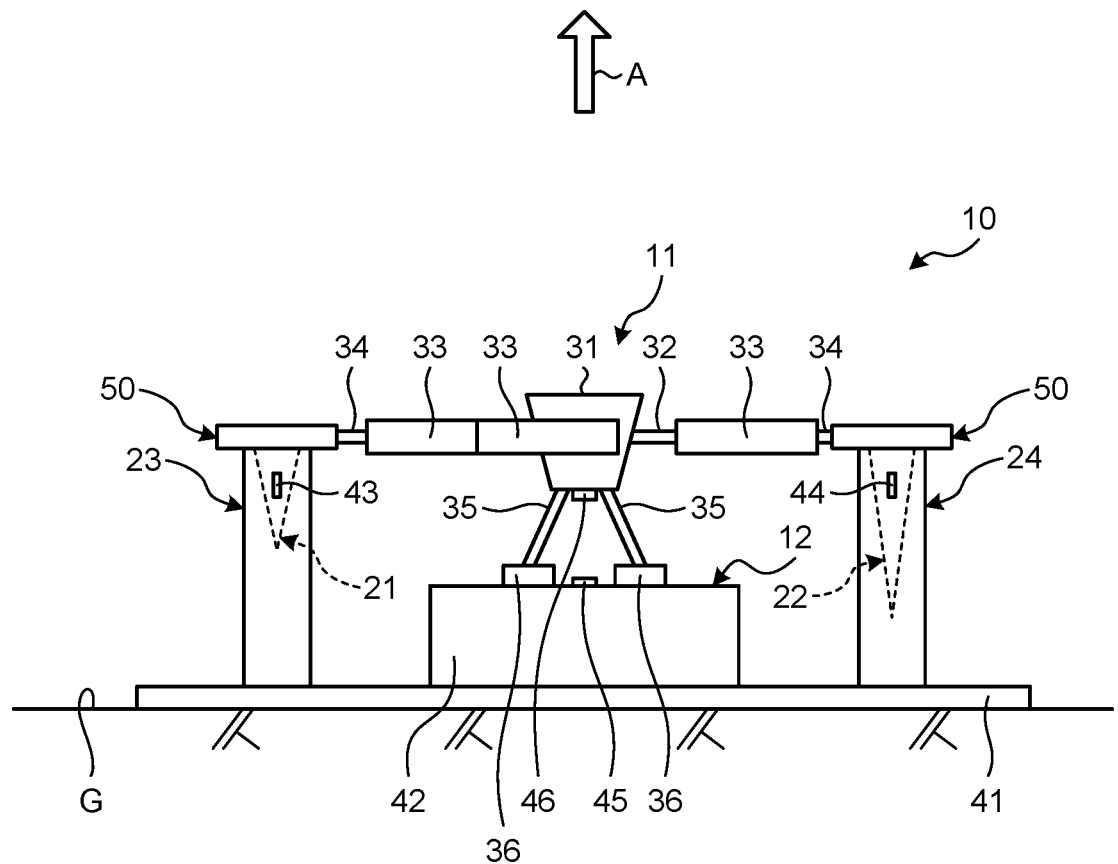
FIG. 1B is a front view illustrating another takeoff and landing assist apparatus for a flight vehicle according to the present embodiment.
Figure 2:
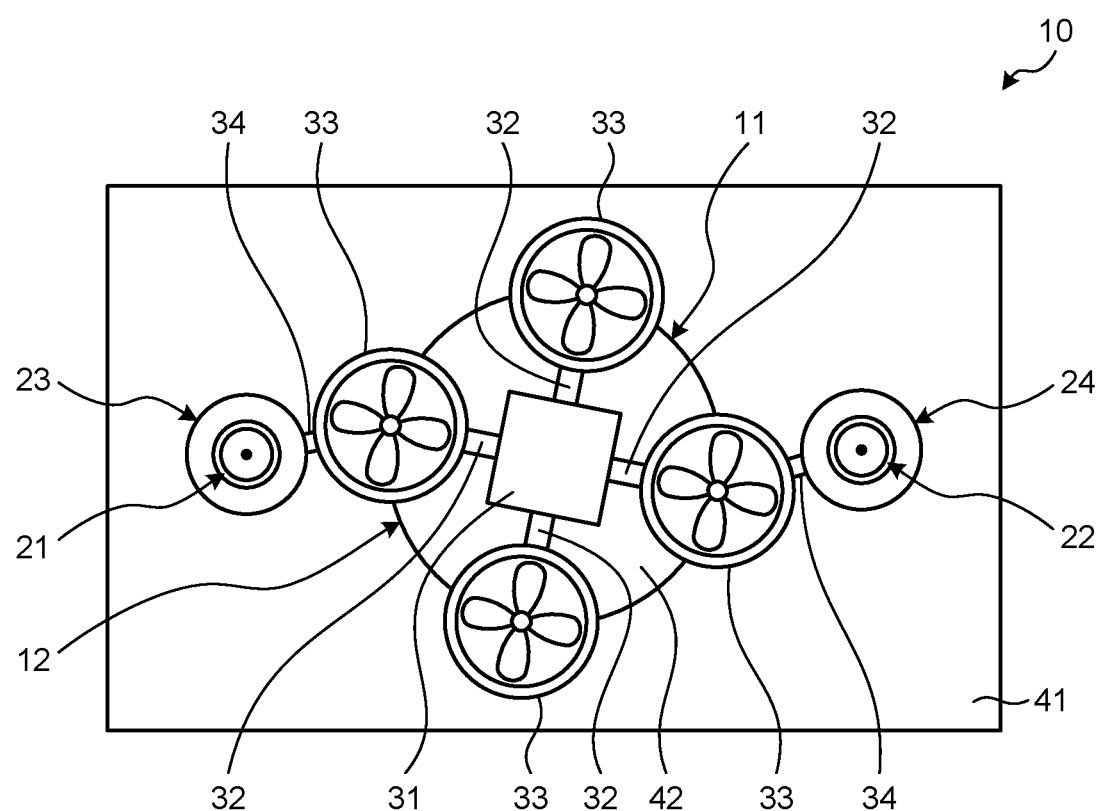
FIG. 2 is a plan view illustrating the takeoff and landing assist apparatus for a flight vehicle.

FIG. 1 is a front view illustrating a takeoff and landing assist apparatus for a flight vehicle according to the present embodiment, and FIG. 2 is a plan view illustrating the takeoff and landing assist apparatus for a flight vehicle. Here, description is made of an example of a flight vehicle including rotor blades each driven by a driving device such as a motor or an internal-combustion engine. The lifting power (effect) of the rotor blades of the flight vehicle is adjusted (controlled) by increasing or decreasing the number of rotations of the rotor blades.

In the present embodiment, as illustrated in FIG. 1 and FIG. 2, a takeoff and landing assist apparatus 10 for a flight vehicle is to enable a flight vehicle 11 to automatically take off from a target point 12 or be landed on the target point 12. The takeoff and landing assist apparatus 10 for a flight vehicle includes a plurality of (in the present embodiment, two) guide rods 21 and 22 that are provided near the target point 12 in parallel to each other, and a plurality of (in the present embodiment, two) guide rings 23 and 24 that are provided to the flight vehicle 11 and through which the plurality of guide rods 21 and 22 can be inserted.

The flight vehicle 11 has a plurality of (in the present embodiment, four) rotor blades 33 connected thereto through connectors 32 outside a main body 31. The rotor blades 33 are disposed at predetermined intervals in a circumferential direction, and each can be rotated by an incorporated driving device (such as a motor or an internal-combustion engine) (not shown). When the rotor blades 33 are rotated, the lifting power is increased so that the flight vehicle 11 can ascend. When the number of rotations of the rotor blades 33 is decreased, the lifting power is decreased so that the flight vehicle 11 can descend. In addition, by changing the number of rotations of each rotor blade 33, the lifting power of each rotor blade 33 can be changed so that the posture can be tilted and the flight vehicle 11 can move to a horizontal direction.

The flight vehicle 11 includes the guide rings 23 and 24 that are connected through connectors 34 on the outside of the two rotor blades 33 among the plurality of rotor blades 33. The two rotor blades 33 to which the guide rings 23 and 24 are attached are disposed at diagonal positions with respect to a center of the flight vehicle 11. In addition, the flight vehicle 11 is provided with a plurality of leg parts 36 through connector rods 35.

On the other hand, a support plate 41 is provided on a top surface of a ground G, and a takeoff and landing table 42 to serve as the target point 12 is provided on the support plate 41. This takeoff and landing table 42 has a cylindrical shape, and on the takeoff and landing table 42, the leg parts 36 of the flight vehicle 11 can be landed. On the support plate 41, the guide rods 21 and 22 are provided to stand on opposite sides of the takeoff and landing table 42. These two guide rods 21 and 22 are disposed at diagonal positions with respect to a center of the takeoff and landing table 42.

The center-to-center distance between the guide rod 21 and the guide rod 22 and the center-to-center distance between the guide ring 23 and the guide ring 24 are the same. Therefore, the guide rods 21 and 22 provided to the support plate 41 at the ground G can be inserted into the guide rings 23 and 24 provided to the flight vehicle 11, respectively.

The guide rods 21 and 22 have different total lengths, and the guide rod 21 is longer than the guide rod 22. In this case, it is desirable that the length of each of the guide rods 21 and 22 is set so that the flight vehicle 11 is not influenced easily by the surface effect from the ground G. In this case, the surface effect from the ground G for the flight vehicle 11 is different depending on the weight of the flight vehicle 11, the output of each rotor blade 33, or the like; in the present embodiment, for example, the surface effect is in the range of 30 cm to 5 m. Each of the guide rods 21 and 22 has a tapered shape that becomes thinner toward a distal end. That is to say, each of the guide rods 21 and 22 has a conical shape, has a lower end fixed to the support plate 41, and has a tapered shape in which an outer diameter decreases toward an upper end. The guide rods 21 and 22 at the target point 12 can be inserted into the guide rings 23 and 24 on the flight vehicle 11 side; however, at a position where the flight vehicle 11 is placed on the takeoff and landing table 42, there is a space between an inner peripheral surface of the guide rings 23 and 24 and an outer peripheral surface of the guide rods 21 and 22.

These two guide rods 21 and 22 are disposed in parallel to each other along a vertical direction from the support plate 41. In the present embodiment, the two guide rods 21 and 22 and the two guide rings 23 and 24 are provided; however, three or more guide rods and three or more guide rings may be provided.

In addition, detectors 43 and 44 are provided to detect that the guide rings 23 and 24 are passed by the guide rods 21 and 22. The detectors 43 and 44 are provided at an upper part of the guide rods 21 and 22, respectively and detect the passing of the guide rings 23 and 24. Furthermore, a target object (for example, a plurality of LED lamps) 45 is provided on a top surface of the takeoff and landing table 42 corresponding to the target point 12, and meanwhile, on the flight vehicle 11, a detector (such as a camera) 46 is provided to detect the target object 45.

The guide rods 21 and 22 have different lengths, and the guide rod 21 is longer than the guide rod 22. In this case, it is desirable that the length of each of the guide rods 21 and 22 is set so that the flight vehicle 11 is not influenced easily by the surface effect from the ground G. In this case, the surface effect from the ground G for the flight vehicle 11 is different depending on the weight of the flight vehicle 11, the output of each rotor blade 33, or the like; in the present embodiment, for example, the surface effect is in the range of 30 cm to 5 m. Each of the guide rods 21 and 22 has a tapered shape that becomes thinner toward a distal end. That is to say, each of the guide rods 21 and 22 has a conical shape, has a lower end fixed to the support plate 41, and has a tapered shape in which an outer diameter decreases toward an upper end. The guide rods 21 and 22 at the target point 12 can be inserted into the guide rings 23 and 24 on the flight vehicle 11 side; however, at a position where the flight vehicle 11 is placed on the takeoff and landing table 42, there is a space between an inner peripheral surface of the guide rings 23 and 24 and an outer peripheral surface of the guide rods 21 and 22.

In a case where the guide rods 21 and 22 are provided to the movable body, it is desirable to provide an adjustment mechanism 50 that causes the guide rods 21 and 22 to keep standing along the vertical direction. In addition, in this case, the adjustment mechanism 50 desirably tilts distal ends of the guide rods 21 and 22 against the wind by the amount in proportion to the wind speed on the basis of information from an anemometer (not shown) provided to the flight vehicle 11. The center-to-center distance between the guide rods 21 and 22 and the center-to-center distance between the guide rings 23 and 24 are kept to be the same even if the adjustment mechanism 50 adjusts to keep the guide rods 21 and 22 along the vertical direction or tilts the distal ends against the wind by the amount in proportion to the wind speed. Specifically, when the angle of each of the guide rods 21 and 22 is adjusted by the adjustment mechanism 50, the support plate 41 is also tilted or the space (distance) between the guide rods 21 and 22 is also adjusted.

Here, a takeoff and landing method for a flight vehicle by the takeoff and landing assist apparatus 10 for a flight vehicle according to the present embodiment is described.

Figure 3:
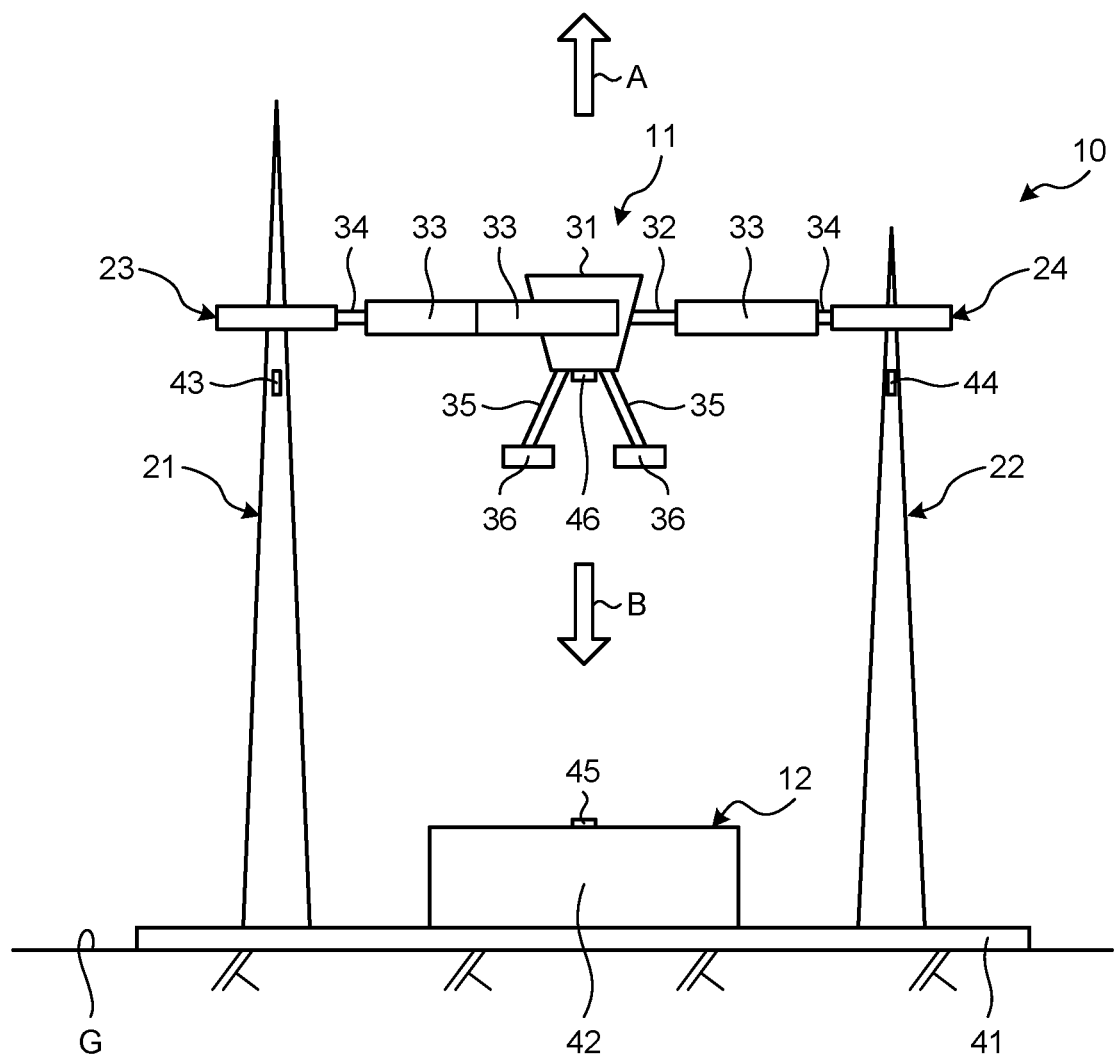
FIG. 3 is a schematic view illustrating an operation when the flight vehicle takes off or is landed.

In a case where the flight vehicle 11 takes off, as illustrated in FIG. 1, the rotor blades 33 of the flight vehicle 11 placed on the takeoff and landing table 42 to serve as the target point 12 are driven to rotate; thus, the lifting power is generated in the main body 31 and the flight vehicle 11 ascends. Here, the horizontal movement of the flight vehicle 11 is restricted because the guide rods 21 and 22 are inserted into the guide rings 23 and 24 as illustrated in FIG. 3. Therefore, the flight vehicle 11 ascends vertically in an upward direction A along the guide rods 21 and 22. As indicated by a two-dot chain line in FIG. 4, upon the detection of the guide rings 23 and 24 by the detectors 43 and 44, it is determined that the guide rings 23 and 24 of the flight vehicle 11 will go out of the guide rods 21 and 22 in a predetermined period of time. Then, as indicated by a solid line in FIG. 4, the flight vehicle 11 gets free from the guide rods 21 and 22 and flies in a desired direction.

Figure 4:
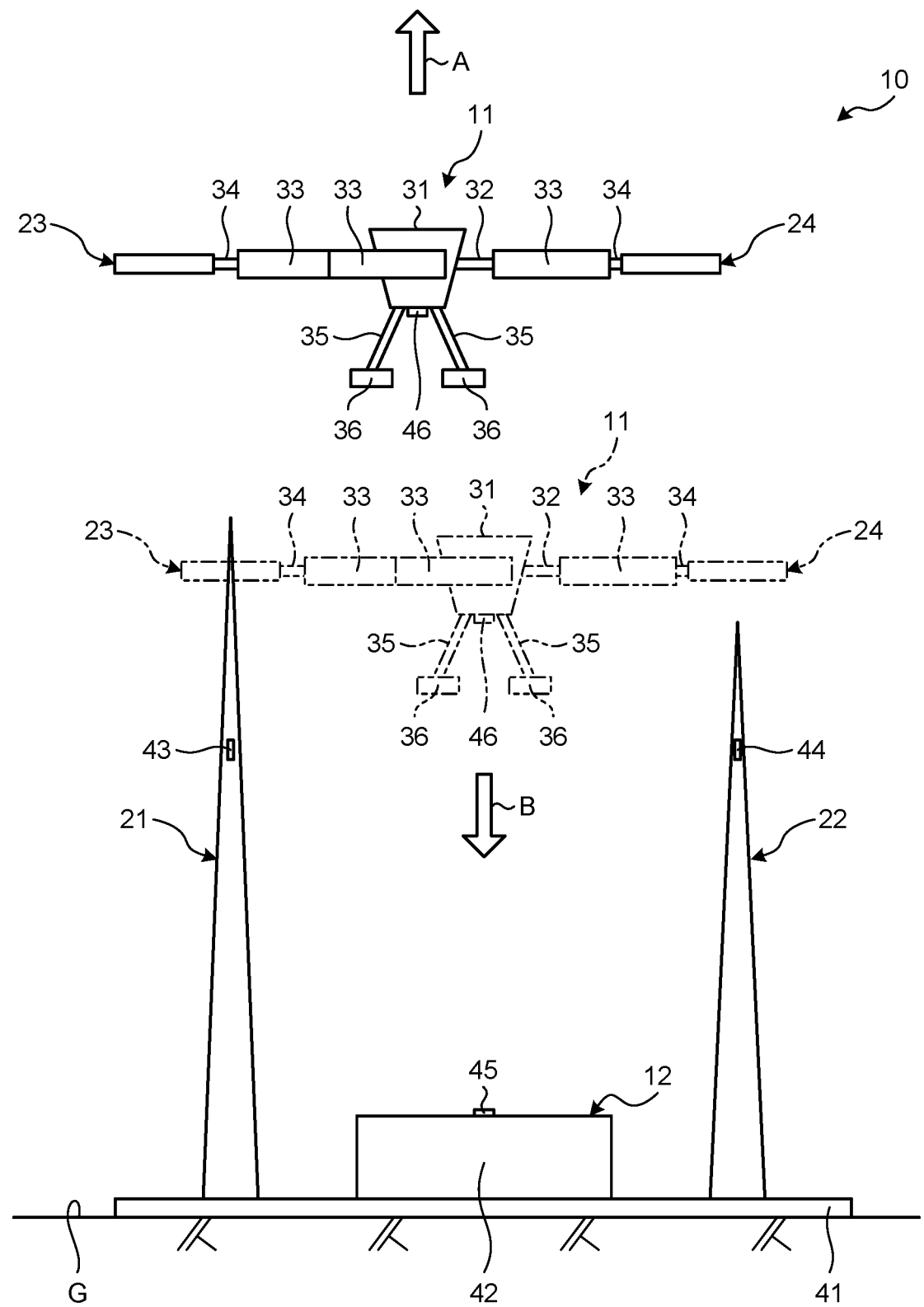
FIG. 4 is a schematic view illustrating an operation when the flight vehicle takes off or is landed.

On the other hand, in a case where the flight vehicle 11 is landed, as illustrated in FIG. 4, the rotation of the rotor blades 33 of the flight vehicle 11 in a state that the flight vehicle 11 flies out of the guide rods 21 and 22 is reduced. Thus, the lifting power generated in the main body 31 is reduced and the flight vehicle 11 descends. Here, the detector (camera) 46 provided to the flight vehicle 11 detects the target object (LED lamp) 45 on the top surface of the takeoff and landing table 42 corresponding to the target point 12, and performs image processing of the detection result. From the position and the shape of the image, the position of the flight vehicle 11 in the horizontal direction relative to the target point 12 is recognized and moreover the positions of the guide rods 21 and 22 in the circumferential direction of the guide rings 23 and 24 are recognized.

Then, the posture of the flight vehicle 11 is controlled so that the main body 31 comes above the target point 12 and the guide rings 23 and 24 come above the guide rods 21 and 22, and with that posture kept, the flight vehicle 11 descends vertically in a downward direction B. Then, the guide rods 21 and 22 are inserted into the guide rings 23 and 24 as indicated by a two-dot chain line in FIG. 4, so that the horizontal movement of the flight vehicle 11 is restricted. Here, first, the straight movement of the flight vehicle 11 in the horizontal direction is restricted by the insertion of the long guide rod 21 into the guide ring 23, and next, the circumferential movement of the flight vehicle 11 in the horizontal direction is restricted by the insertion of the guide rod 22 into the guide ring 24.

Then, the movement of the flight vehicle 11 in the horizontal direction is restricted by the insertion of the guide rods 21 and 22 into the guide rings 23 and 24, and the flight vehicle 11 descends. Then, upon a detection of the guide rings 23 and 24 by the detectors 43 and 44 as illustrated in FIG. 3, the number of rotations of the rotor blades 33 is decreased and the flight vehicle 11 stops. Then, since the flight vehicle 11 is restricted by the guide rods 21 and 22 through the guide rings 23 and 24, the flight vehicle 11 descends while being guided by the guide rods 21 and 22, and is placed on the takeoff and landing table 42 corresponding to the target point 12.

The takeoff and landing assist apparatus for a flight vehicle according to the present embodiment is the takeoff and landing assist apparatus 10 for a flight vehicle that enables the flight vehicle 11 with the rotor blades 33 to take off from or be landed on the target point 12. The takeoff and landing assist apparatus 10 includes the guide rods 21 and 22 that are provided to the flight vehicle 11 in parallel to each other, and the guide rings 23 and 24 that are provided to the target point 12 and into which the guide rods 21 and 22 can be inserted. The center-to-center distance of the guide rods 21 and 22 and the center-to-center distance of the guide rings 23 and 24 are set to be the same.

Therefore, when the flight vehicle 11 takes off or is landed, inserting the guide rods 21 and 22 into the guide rings 23 and 24 prevents the flight vehicle 11 from moving in the horizontal direction. Thus, a disturbance of the horizontal posture of the flight vehicle 11 can be reduced even under the influence of a change in ambient environment or a surface effect. Accordingly, the flight vehicle 11 can take off from or be landed on the target point 12 easily and stably.

In the takeoff and landing assist apparatus for a flight vehicle according to the present embodiment, the guide rods 21 and 22 have different total lengths. Therefore, when the flight vehicle 11 is landed on the target point 12, the guide rods 21 and 22 with the different lengths are inserted into the guide rings 23 and 24 sequentially, so that the guide rods 21 and 22 can easily be inserted into the guide rings 23 and 24, and moreover, the flight vehicle 11 can be easily kept in the horizontal state.

In the takeoff and landing assist apparatus for a flight vehicle according to the present embodiment, each of the guide rods 21 and 22 has a tapered shape that becomes thinner toward the distal ends. Therefore, the guide rods 21 and 22 can easily be inserted into the guide rings 23 and 24.

The takeoff and landing assist apparatus for a flight vehicle according to the present embodiment includes the detectors 43 and 44 for detecting that the guide rings 23 and 24 are passed by the guide rods 21 and 22. Therefore, since the detectors 43 and 44 detect that the guide rings 23 and 24 are passed by the guide rods 21 and 22, it is possible to recognize that the flight vehicle 11 is restricted by and released from the guide rods 21 and 22 in the horizontal direction and thus, the output of the flight vehicle 11 can be properly adjusted.

In the takeoff and landing assist apparatus for a flight vehicle according to the present embodiment, the guide rods 21 and 22 have different lengths. Therefore, when the flight vehicle 11 is landed on the target point 12, the guide rods 21 and 22 with the different lengths are inserted into the guide rings 23 and 24 sequentially, so that the guide rods 21 and 22 can easily be inserted into the guide rings 23 and 24, and moreover, the flight vehicle 11 can be easily kept in the horizontal state.

In the takeoff and landing assist apparatus for a flight vehicle according to the present embodiment, the target object 45 is provided at the target point 12. The target object 45 can be detected by the detector 46 of the flight vehicle 11. Therefore, the flight vehicle 11 can be landed while detecting the target object 45 provided at the target point 12 and this allows the flight vehicle 11 to be landed on the target point 12 with high accuracy.

In the takeoff and landing assist apparatus for a flight vehicle according to the present embodiment, the guide rings 23 and 24 are disposed outside the rotor blades 33. Therefore, interference between the guide rods 21 and 22 and the rotor blades 33 when the flight vehicle 11 takes off and is landed can be reduced.

In the takeoff and landing assist apparatus for a flight vehicle according to the present embodiment, the guide rods 21 and 22 are disposed at the target point 12 along the vertical direction. Therefore, by moving the flight vehicle 11 along the vertical direction, the guide rods 21 and 22 can be inserted into the guide rings 23 and 24 easily.

In the takeoff and landing assist apparatus for a flight vehicle according to the present embodiment, the adjustment mechanism to keep the guide rods 21 and 22 along the vertical direction is provided. Therefore, when the guide rods 21 and 22 are provided to a movable body, the adjustment mechanism can keep the guide rods 21 and 22 always along the vertical direction, so that the guide rods 21 and 22 can be inserted into the guide rings 23 and 24 easily.

In the takeoff and landing assist apparatus for a flight vehicle according to the present embodiment, the adjustment mechanism can tilt the distal ends of the guide rods 21 and 22 against the wind as the wind speed increases, on the basis of information from the anemometer (not shown) provided to the flight vehicle 11. Therefore, when the flight vehicle 11 that is in a hovering state is landed by tilting the flight vehicle 11 against the wind, the guide rods 21 and 22 can be inserted into the guide rings 23 and 24 easily.

Here, the center-to-center distance between the guide rods 21 and 22 and the center-to-center distance between the guide rings 23 and 24 are kept to be the same even if the adjustment mechanism adjusts to keep the guide rods 21 and 22 along the vertical direction or tilts the distal ends against the wind by the amount in proportion to the wind speed.

The flight device according to the present embodiment includes the flight vehicle 11 including the rotor blades 33, and the takeoff and landing assist apparatus 10 for a flight vehicle. Therefore, when the flight vehicle 11 takes off or is landed by using the takeoff and landing assist apparatus 10 for a flight vehicle, inserting the guide rods 21 and 22 into the guide rings 23 and 24 enables the flight vehicle 11 to take off from or be landed on the target point 12 easily and stably.

The flight device according to the present embodiment includes the guide rods 21 and 22 provided to the movable body, and includes the guide rings 23 and 24 provided to the flight vehicle 11. Therefore, the flight vehicle 11 can take off from or be landed on the movable body by the use of the guide rings 23 and 24, and the flight device can be moved to a desired place and be used.

The flight device according to the present embodiment includes the guide rods 21 and 22 provided to the building, and includes the guide rings 23 and 24 provided to the flight vehicle 11. Therefore, the flight vehicle 11 can take off from or be landed on the building by the use of the guide rings 23 and 24, and for example, can convey baggage easily.

Note that although the guide rods 21 and 22 are provided to the target point 12 and the guide rings 23 and 24 are provided to the flight vehicle 11 in the above-described embodiment, the guide rings may be provided to the target point 12 and the guide rods may be provided to the flight vehicle 11.

In addition, although the flight vehicle 11 is placed on the takeoff and landing table 42 in the above-described embodiment, the flight vehicle 11 may be placed on the support plate 41 or on the ground G. Furthermore, the guide rods 21 and 22 may include a stepped part and the guide rings 23 and 24 of the flight vehicle 11 may be in contact with the stepped part of the guide rods 21 and 22.

In the above-described embodiment, the detector (camera) 46 provided to the flight vehicle 11 detects the target object (LED lamp) 45 on an upper surface of the takeoff and landing table 42 to serve as the target point 12, thereby controlling the posture of the flight vehicle 11; however, the present invention is not limited to this structure. For example, a transmitter and a receiver that exchange a position signal between the flight vehicle 11 and the target point 12 may be provided, and the flight vehicle 11 may be landed on the target point 12 in accordance with the position signal. In addition, the flight vehicle 11 may have a GPS and based on a detection result of the GPS, the flight vehicle 11 may be landed on the target point 12.

In the above-described embodiment, the takeoff and landing assist apparatus 10 for a flight vehicle causes the flight vehicle 11 to take off from or be landed on the target point 12 automatically; however, the takeoff and landing assist apparatus 10 may cause the flight vehicle 11 to take off from or be landed on the target point 12 manually.

REFERENCE SIGNS LIST 10 takeoff and landing assist apparatus for flight vehicle
11 flight vehicle
12 target point
21, 22 guide rod
23, 24 guide ring
31 main body
33 rotor blade
36 leg part
41 support plate
42 takeoff and landing table
43, 44 detector
45 target object
46 detector
g ground

The invention claimed is:

1. A takeoff and landing assist apparatus for a flight vehicle with rotor blades to cause the flight vehicle to take off from or be landed on a target point, the takeoff and landing assist apparatus comprising:
a plurality of guide rods in parallel to each other, the plurality of guide rods being provided to one of the flight vehicle and the target point;
a plurality of guide rings into which the plurality of guide rods are insertable, the plurality of guide rings being provided to the other of the flight vehicle and the target point, wherein
a center-to-center distance between the plurality of guide rods and a center-to-center distance between the plurality of guide rings are set to be same, and
each of the plurality of guide rods has a different length.

2. The takeoff and landing assist apparatus for a flight vehicle according to claim 1, wherein the plurality of guide rods each have a tapered shape that is tapered toward a distal end.

3. The takeoff and landing assist apparatus for a flight vehicle according to claim 1, further comprising a detector configured to detect that the guide ring is passed by the guide rod.

4. The takeoff and landing assist apparatus for a flight vehicle according to claim 1, wherein the plurality of guide rods include three or more guide rods.

5. The takeoff and landing assist apparatus for a flight vehicle according to claim 1, wherein a target object is provided to the target point, the target object being detectable from the flight vehicle side.

6. The takeoff and landing assist apparatus for a flight vehicle according to claim 1, the plurality of guide rods or the plurality of guide rings are disposed outside the rotor blades.

7. The takeoff and landing assist apparatus for a flight vehicle according to claim 1, wherein the plurality of guide rods are oriented vertically at the target point.

8. The takeoff and landing assist apparatus for a flight vehicle according to claim 7, further comprising an adjustment mechanism configured to cause the plurality of guide rods to keep standing along the vertical direction.

9. The takeoff and landing assist apparatus for a flight vehicle according to claim 8, wherein the adjustment mechanism is configured to largely tilt distal ends of the plurality of guide rods against wind based on information from an anemometer when a wind speed increases.

10. A flight device, comprising:
a flight vehicle including rotor blades; and
the takeoff and landing assist apparatus for a flight vehicle according to claim 1.

11. The flight device according to claim 10, wherein
the plurality of guide rods are provided to a movable body, and
the plurality of guide rods are provided to the flight vehicle.

12. The flight device according to claim 10, wherein
the plurality of guide rods are provided to a building, and
the plurality of guide rings are provided to the flight vehicle.

13. A method of landing in the takeoff and landing assist apparatus according to claim 3 comprising:
inserting the longest guide rod into one of the guide rings so that a straight movement of the flight vehicle in a horizontal direction is restricted;
inserting the guide rods other than the longest guide rod into the other guide rings so that a circumferential movement of the flight vehicle in the horizontal direction is restricted;
descending the flight vehicle;
decreasing the number of rotations of the rotor blades upon a detection that the guide rings are passed by the guide rods by the detectors and stop the flight vehicle; and
descending, by restricting the flight vehicle by the guide rods and through the guide rings, the flight vehicle while being guided by the guide rods and placing the flight vehicle on the target point.

* * * * *